United States Patent
Varunjikar et al.

(10) Patent No.: US 9,738,309 B2
(45) Date of Patent: Aug. 22, 2017

(54) ACTIVE-DAMPING BASED APPROACH TO MITIGATE EFFECTS OF RACK DISTURBANCES ON EPS SYSTEMS

(71) Applicant: Steering Solutions IP Holding Corporation, Saginaw, MI (US)

(72) Inventors: Tejas M. Varunjikar, Saginaw, MI (US); Ashok Chandy, Fenton, MI (US); Michael A. Eickholt, Chesaning, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/954,210

(22) Filed: Nov. 30, 2015

(65) Prior Publication Data

US 2017/0151977 A1    Jun. 1, 2017

(51) Int. Cl.
| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *G06F 19/00* | (2011.01) |
| *B62D 5/04* | (2006.01) |

(52) U.S. Cl.
CPC .......... *B62D 5/0472* (2013.01); *B62D 6/008* (2013.01)

(58) Field of Classification Search
USPC .......................................................... 701/41
See application file for complete search history.

(56) References Cited

U.S. PATENT DOCUMENTS

| | | | |
|---|---|---|---|
| 5,919,241 A | 7/1999 | Bolourchi et al. | |
| 2008/0308342 A1* | 12/2008 | Nishimori | B62D 5/0472 180/446 |
| 2009/0157258 A1* | 6/2009 | Hales | B62D 6/008 701/41 |
| 2015/0375779 A1* | 12/2015 | Varunjikar | B62D 5/0472 701/41 |
| 2016/0200354 A1* | 7/2016 | Kimura | B62D 5/0472 701/42 |

* cited by examiner

*Primary Examiner* — Lail Kleinman
(74) *Attorney, Agent, or Firm* — Cantor Colburn LLP

(57) ABSTRACT

A system for actively damping a power steering system includes a damping activation module that generates a damping activation signal based on a motor velocity signal, a t-bar torque signal, and a final motor command; a command calculation module that generates a calculated command based on the motor velocity signal and a vehicle speed signal; and a damping calculation module that generates a damping command based on the damping activation signal and the calculated command, the damping command reduces a motor velocity of a motor of the power steering system to mitigate a rack disturbance.

20 Claims, 7 Drawing Sheets

ACTIVE-DAMPING BASED APPROACH TO MITIGATE EFFECTS OF RACK DISTURBANCES ON EPS SYSTEMS

BACKGROUND OF THE INVENTION

The present invention relates to actively damping the effects of rack disturbances on an EPS system.

Electric Power Steering (EPS) systems use an electric motor to provide assist to the driver and to mitigate road disturbances. Linear system and control analysis techniques can be used to recommend calibrations for optimal steering feel and road disturbance rejection.

Due to physics of an electric motor, available motor torque can decrease as the motor velocity increases. This is typically described by a motor envelope curve that represents available motor torque versus motor velocity plot as shown in FIG. 1A. Also, most of the driving/operating conditions for an EPS system typically occur within a region of a motor envelope closer to origin, i.e. maximum available motor torque is more or less constant as shown in FIG. 1A. However, an EPS system can be subjected to higher than nominal rack loads, causing the system to operate at much higher velocities. For example, in one experiment, driving on an off-road surface with sudden braking lead to 50% higher than typical steering loads which lead to 100% higher than typical motor velocities. This is a complex nonlinear phenomenon that involves factors including an EPS mechanical design, motor design, motor control & calibrations, EPS control & calibrations, chassis dynamics etc. These high rack loads can cause high motor velocity in an EPS system, reducing maximum available motor torque in the process as shown in FIG. 1A. If the combination of high motor velocity and reduced maximum available motor torque occurs as shown, for example, in FIG. 1A, the motor may not be able to produce sufficient reaction torque to match the rack load acting on EPS system. This may lead to an additional increase in motor velocity. This cycle continues, leading to undesirable, high motor velocities in an EPS system. A challenge is to recognize this phenomenon and apply motor reaction torque quickly (e.g.) before motor velocity further increases. There are different ways to mitigate this phenomenon.

One way to mitigate this phenomenon is to modify an EPS mechanical design to reduce the high motor velocities in the system. However, this technique can cause degradation in steering feel. A larger capacity motor can be used to provide more reaction torque but this would mean significantly more cost. Limitations of both of these methods make an active damping algorithm desirable option for mitigating effects of high rack loads.

Active damping is typically used in an EPS system to improve steering performance. U.S. Pat. No. 5,919,241 describes the use of active damping based on steering velocity and other signals to achieve desired frequency response and performance of an EPS system. U.S. Pat. No. 6,647,329 B2 and U.S. Pat. No. 6,122,579 also describe different strategies for a damping function. U.S. Pat. No. 8,612,094 B2 presents a strategy to scale frequency dependent motor damping based on the velocity signal itself. U.S. Pat. No. 7,549,504 B2 and US 2009/0157258 A1 present a methodology for applying active damping, to an EPS system, that can operate differently in different quadrants, where a quadrant is defined based on steering wheel torque and angular velocity.

Generally speaking, active damping strategies are often used is EPS systems to give optimal steering feel and road disturbance rejection for typical driving conditions. In these conditions, rack loads are within the typical operating range of an EPS system and the motor velocities are lower (typical driving region in the Motor Envelope FIG. 1A). In order to prevent high motor velocities (as described above) a much higher amount of damping is desired. Typically, such damping magnitudes will not be desired for normal driving conditions. Hence, these high damping magnitudes should be used outside the typical driving operating range and upon detection of the phenomenon described above. The detection of this phenomenon is crucial in order to mitigate such rack disturbances.

SUMMARY OF THE INVENTION

In accordance with one embodiment, a system for actively damping a power steering system comprises a damping activation module that generates a damping activation signal based on a motor velocity signal, a t-bar torque signal, and a final motor command; a command calculation module that generates a calculated command based on the motor velocity signal and a vehicle speed signal; and a damping calculation module that generates a damping command based on the damping activation signal and the calculated command, the damping command reducing a motor velocity of a motor of the power steering system to mitigate a rack disturbance.

In accordance with another embodiment, a method for actively damping a power steering system, the method comprises determining a damping activation signal based on a motor velocity signal, a t-bar torque signal, and a final motor command; determining a calculated command based on the motor velocity signal and a vehicle speed signal; and generating a damping command based on the damping activation signal and the calculated command, the damping command reducing a motor velocity of a motor of the power steering system to mitigate a rack disturbance.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1A:
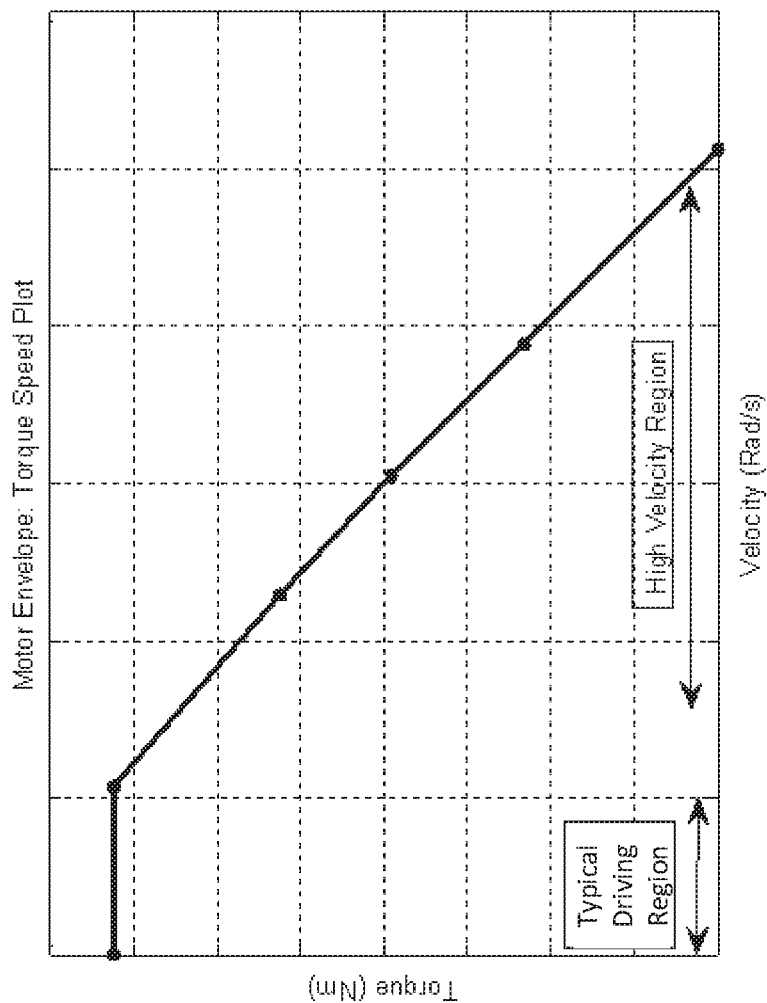
FIG. 1A is a motor envelope plot.

Referring now to the Figures, where the invention will be described with reference to specific embodiments, without limiting same, an exemplary embodiment of a vehicle 10 including a steering system 12 is illustrated. In various embodiments, the steering system 12 includes a handwheel 14 coupled to a steering shaft 16. In the exemplary embodiment shown, the steering system 12 is an electric power steering (EPS) system that further includes a steering assist unit 18 that couples to the steering shaft 16 of the steering system 12 and to a left tie rod 20 and a right tie rod 22 of the vehicle 10. It should be noted that the steering system 12 may be a rack assist EPS (REPS) as well. The steering assist unit 18 includes, for example, a rack and pinion steering mechanism (not shown) that may be coupled through the steering shaft 16 to a steering actuator motor and gearing. During operation, as the handwheel 14 is turned by a vehicle operator, the motor of the steering assist unit 18 provides the assistance to move the left tie rod 20 and the right tie rod 22 which in turn moves left and right steering knuckles 24, 26, respectively. The left knuckle 24 is coupled to a left roadway wheel 28, and the right knuckle 26 is coupled to a right roadway wheel 30 of the vehicle 10.

Figure 1:
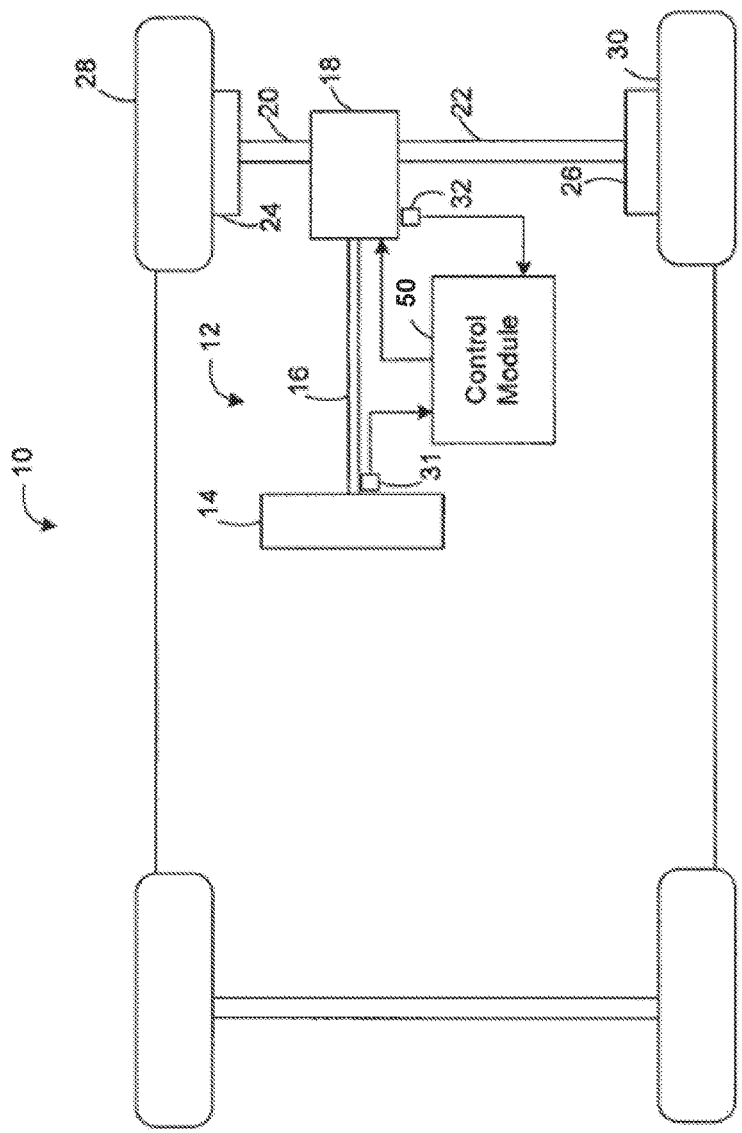
FIG. 1 is a vehicle steering system in accordance with one embodiment of the present disclosure.

As shown in FIG. 1, the vehicle 10 further includes various sensors. In the example shown, a left wheel speed sensor (not shown) senses a rotational speed of the left wheel 28 and a right wheel speed sensor (not shown) senses a rotational speed of the right wheel 30. These sensors can be used to calculate a vehicle speed signal, in some embodiments. A torque sensor 31 is also provided for sensing a t-bar torque placed on the handwheel 14. In the exemplary embodiment as shown, the torque sensor 31 is placed on the hand wheel 14, however it is to be understood that the torque sensor 31 may not always be placed near or on the hand wheel 14. In some embodiments, a motor velocity sensor 32 is included within a steering actuator motor, and senses velocity of a steering actuator motor in the steering assist unit 18. The motor velocity sensor 32 may be included in the steering assist unit 18.

A control module 50 controls the operation of the steering system 12 based on one or more of the sensor signals and further based on the steering control systems and methods of the present disclosure.

The control module 50 determines a damping command. The damping command is applied when certain conditions corresponding to a high rack load are identified based on input signals to the control module 50, including motor velocity, t-bar torque, vehicle speed and a final motor command.

Figure 2:
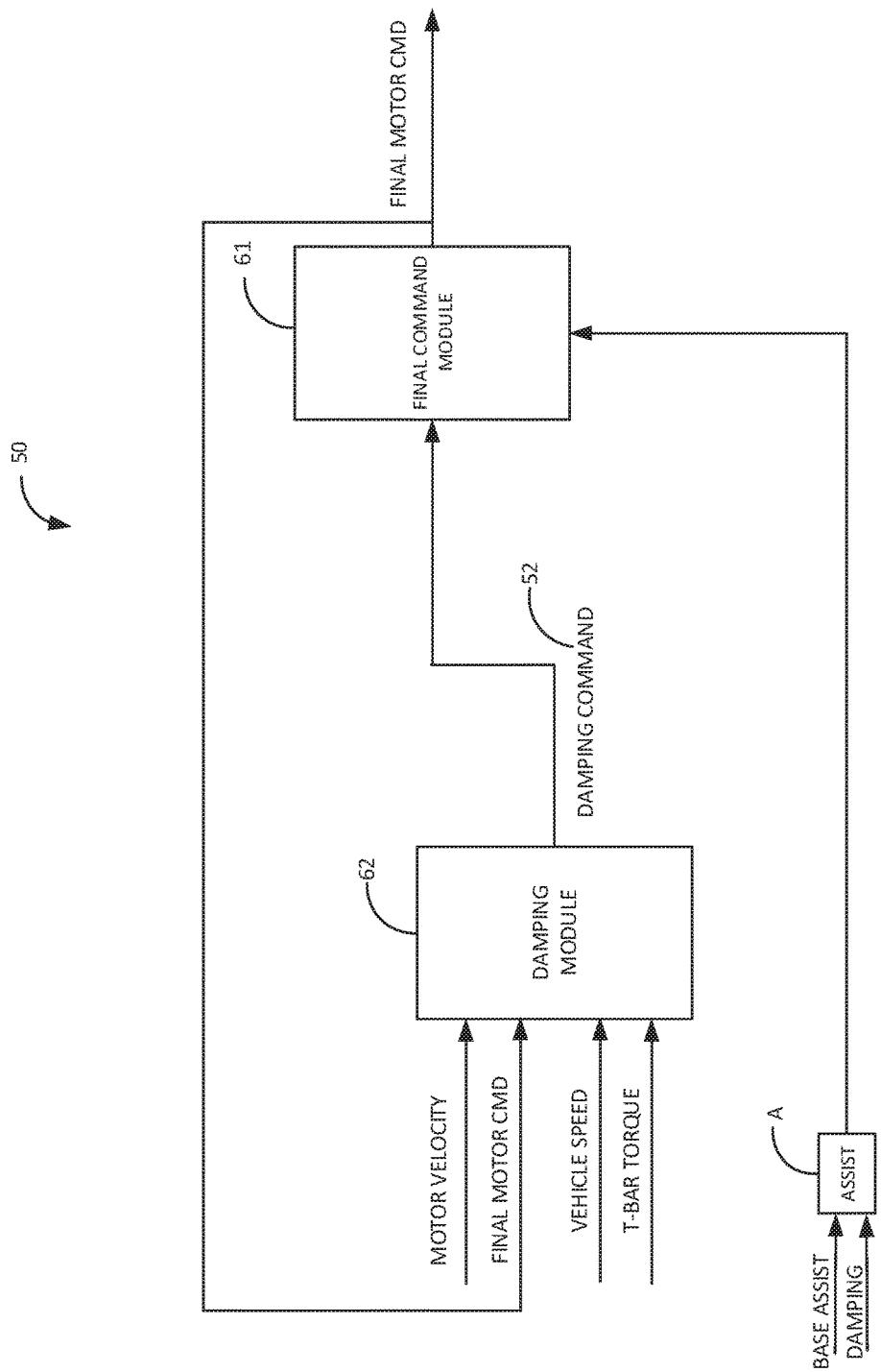
FIG. 2 is an active damping steering system in accordance with one embodiment of the present disclosure.

Turning to FIG. 2, the control module 50 includes at least a damping module 62 and the final command module 61. The damping command may be applied in response to a sudden increase in rack force above typical values. As described in more detail below, the damping command may mitigate a rack disturbance. The damping command 52 may be added to a normal assist command A by a final command module 61 to determine a final motor command that is sent to a motor of the steering assist unit 18 shown in FIG. 1 (e.g., an EPS motor). The final motor command sets a level torque for the motor to produce as output of the motor. The assist command A can be a combination of base assist signals and other base damping signals, return signals, etc. from the electric power steering system.

In some embodiments, the control module 50 receives a motor velocity signal, a final motor command, a vehicle speed, and a t-bar torque. The motor velocity may be measured using a motor velocity sensor included in the steering assist unit 18 (FIG. 1), for example, which indicates the velocity of a motor of the steering assist unit 18. In some embodiments, the final motor command may be the assist command A, however the assist command A is generally not the final command that is sent.

As described in more detail below, the damping command is determined by the damping module 62 to control motor velocity. In one embodiment, the damping command compensates for an increase in motor velocity caused by a high rack load. The damping command may reduce the motor velocity of EPS system when a damping activation module 64 of the damping module 62 sends an active signal (set to 1). However, the damping command may compensate for any sudden increase in motor velocity that reduces available motor torque below a given threshold, by reducing the motor velocity.

Figure 3:
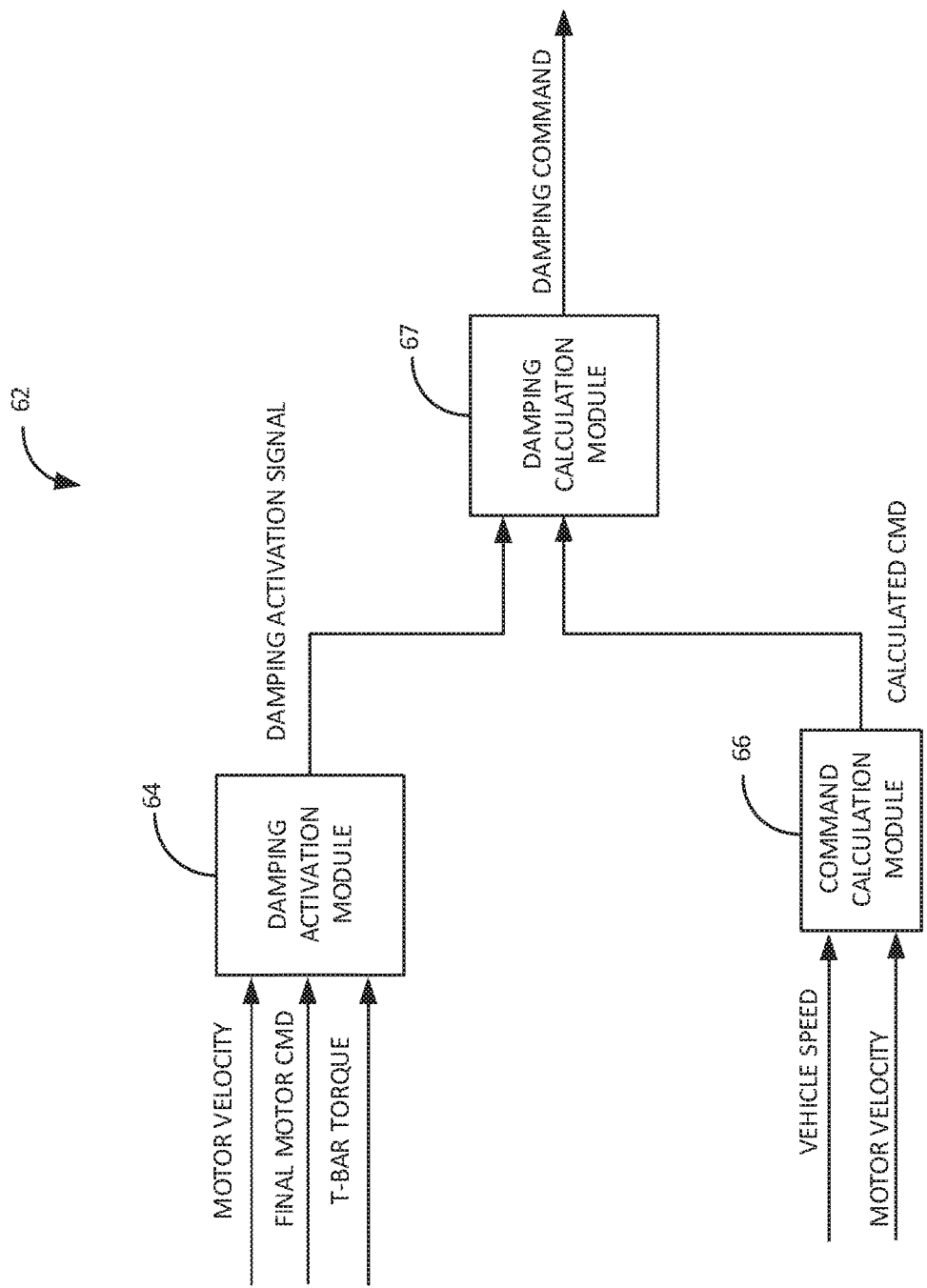
FIG. 3 is a damping module of the active damping steering system in accordance with one embodiment of the present disclosure.

FIG. 3 is one approach for determining the damping command using the damping module 62. The damping module 62 includes the damping activation module 64 and a command calculation module 66. The damping activation module 64 receives as inputs the motor velocity, a final motor command, and the t-bar torque. Based on these inputs, the damping activation module 64 determines the damping activation signal.

The command calculation module 66 may receive, as inputs, the vehicle speed and a motor velocity. Based on the vehicle speed and the motor velocity, the command calculation module 66 generates a calculated command. The calculated command is sent to a damping calculation module 67, where the calculated command is multiplied with the damping activation signal. The output of the damping calculation module 67 is the product of the calculated command and the damping activation signal. The product produced by the damping calculation module 67 is the damping command.

Figure 4:
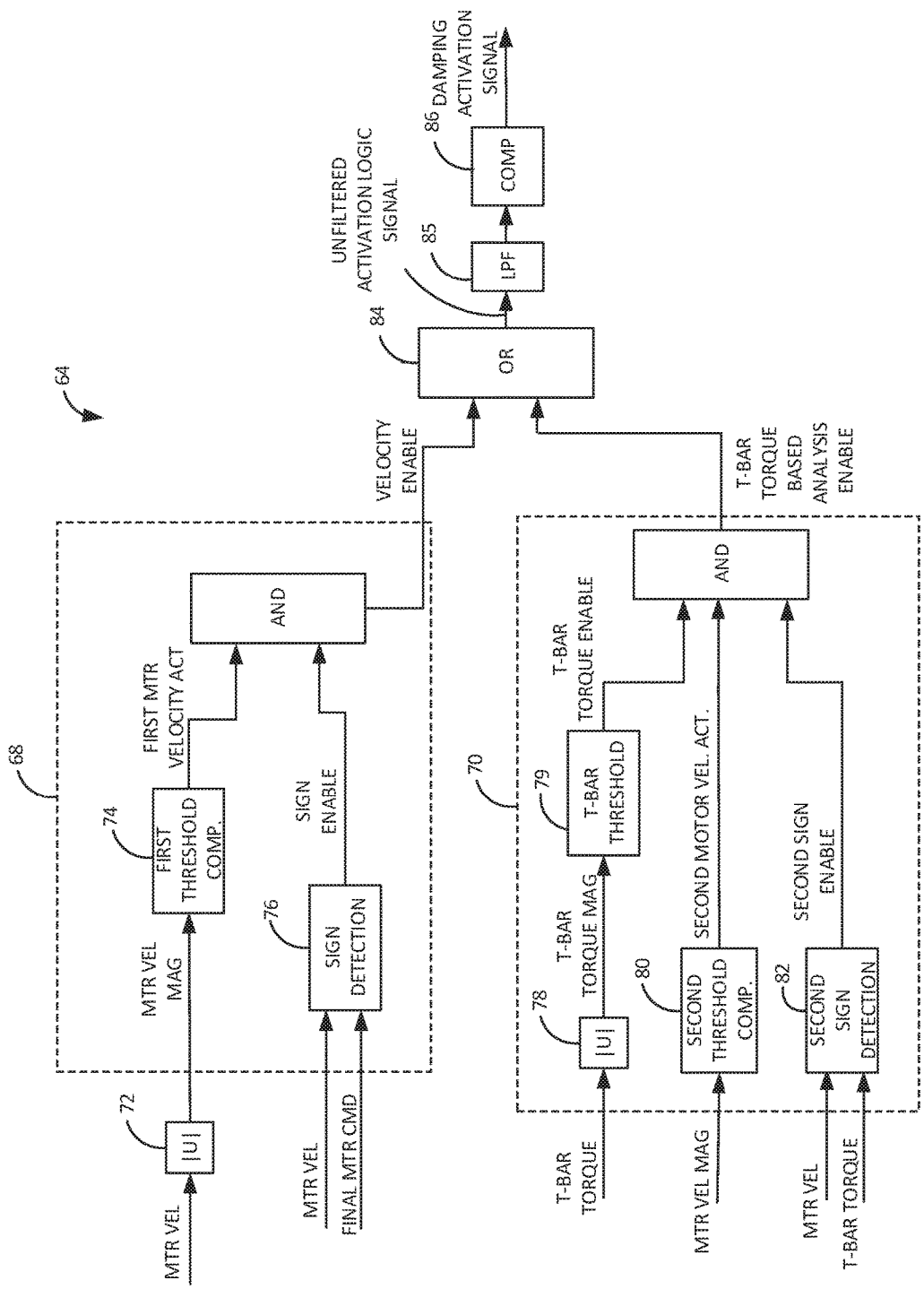
FIG. 4 is a damping activation module of the active damping steering system in accordance with one embodiment of the present disclosure.

FIG. 4 illustrates the damping activation module 64 in more detail. The damping activation module 64 includes a motor-quadrant based velocity analysis module 68 and a t-bar torque based velocity analysis module 70. The motor-quadrant based velocity analysis module 68 determines whether a magnitude of the motor velocity exceeds a damping activation threshold in certain conditions. As shown, the motor velocity is an input to the damping activation module 64. The motor velocity is sent to a magnitude block 72, and the motor velocity magnitude is sent to a velocity threshold comparator 74. If the motor velocity magnitude exceeds a damping activation threshold, the velocity threshold comparator 74 outputs a Boolean value of TRUE for the first motor velocity activation signal; otherwise the first motor velocity activation signal is set to FALSE.

In addition, the motor-quadrant based velocity analysis module 68 includes a sign detection module 76. The sign detection module 76 compares the signs of the final motor command and the motor velocity signal. If the signs differ, the sign detection module 76 outputs a sign enable command set to a Boolean value of TRUE; otherwise the sign enable command is set to FALSE. The motor-quadrant based velocity analysis module 68 outputs a TRUE value for the velocity enable signal if both sign enable command and the first motor velocity activation signal are TRUE; otherwise motor-quadrant based velocity analysis module 68 outputs a FALSE value for the velocity enable signal.

The t-bar torque based velocity analysis module 70 determines whether the t-bar torque exceeds a threshold. Accordingly, a t-bar torque is sent to a magnitude block 78. The t-bar torque magnitude is compared to a t-bar torque threshold value at the t-bar threshold block 79, to determine whether the t-bar torque magnitude exceeds a t-bar torque threshold value. A t-bar torque enable signal is generated by the t-bar threshold block 79 when the t-bar torque magnitude exceeds the t-bar torque threshold. In some embodiments, when the t-bar torque magnitude exceeds the t-bar torque threshold, the t-bar torque enable may be set to a Boolean value of TRUE; otherwise the sign enable command may be set to FALSE.

In addition, the t-bar torque based velocity analysis module 70 determines whether a magnitude of the motor velocity exceeds a second velocity activation threshold. As shown, the motor velocity magnitude is an input to the t-bar torque based velocity analysis module 70. The motor velocity magnitude is sent to a second threshold comparator 80. If the motor velocity magnitude exceeds the second velocity activation threshold, a second motor velocity activation signal is set to Boolean value of TRUE by the second threshold comparator 80; otherwise the second motor velocity activation signal is set to FALSE.

The t-bar torque based velocity analysis module 70 further determines whether the numerical signs of the t-bar torque signal and the motor velocity signal differ. If the signs differ, a second sign detection module 82 sets a second sign enable command to Boolean value of TRUE; otherwise the second sign enable command is set to FALSE.

In some embodiments, the t-bar torque based velocity analysis module 70 determines whether the t-bar torque enable signal, the second motor velocity activation signal, and the second sign enable command are present at an logical AND block, and outputs a t-bar torque based velocity enable signal set to a Boolean value of TRUE when the AND condition is satisfied by the signals being present. Otherwise the t-bar torque based velocity enable signal may be set to FALSE At block 84, a logical OR block detects whether the velocity enable signal or the t-bar torque based analysis enable signal are active (e.g. set to a Boolean value of TRUE). If either signal is active, the logical OR block outputs an unfiltered activation logic signal set to a numerical value of 1, corresponding to Boolean value of TRUE. Otherwise the output of logical block 84 may be set to a numerical value of 0, corresponding to Boolean FALSE condition. In some embodiments, the unfiltered activation logic signal may be subject to further filtering via a low pass filter 85. The output of the low pass filter 85 may be a continuous signal with a value varying between 0 and 1. The output of the low pass filter 85 may be sent to a comparator 86 to determine whether the output of the low pass filter 85 has exceeded a threshold. If the threshold of the comparator is exceeded, the damping activation module 64 then outputs the damping activation signal as a numerical value of 1 (corresponding to Boolean TRUE); otherwise the damping activation signal is set to numerical value of 0 (corresponding to Boolean FALSE). The damping activation signal is further sent to a damping calculation module 67 (FIG. 3).

Figure 5:
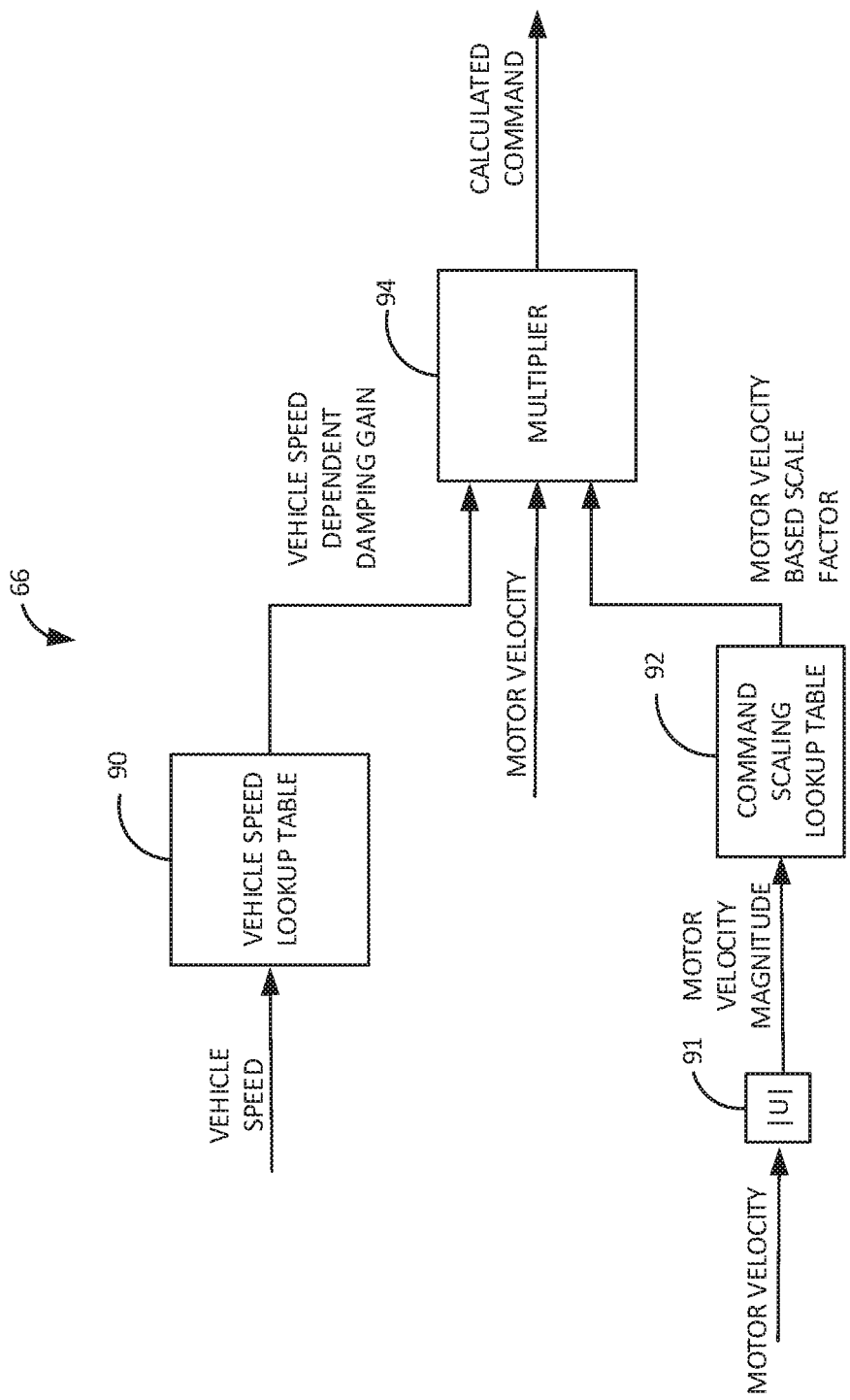
FIG. 5 is a command calculation module in accordance with one embodiment of the present disclosure.

FIG. 5 illustrates the command calculation module 66 in more detail. The command calculation module 66 receives as inputs the motor velocity and the vehicle speed. The vehicle speed is sent to a vehicle speed lookup table 90 to generate a vehicle speed dependent damping gain. The damping gain stored in the vehicle speed lookup table 90 may be reduced to correspond to lower vehicle speeds.

The command calculation module 66 also generates a scale factor between 0 and 1 from a motor velocity based lookup table 92 using the motor velocity as the input. Generally, the motor velocities greater in magnitude correspond to a factor approaching a value of 1. In operation, a motor velocity magnitude is created at block 91 and sent to the motor velocity lookup table 92. The motor velocity lookup table 92 may use an interpolation-use end value method to generate the motor velocity based scale factor.

The motor velocity based scale factor command is then sent to a multiplier 94, along with the motor velocity and the vehicle speed dependent damping gain. The multiplier 94 outputs a calculated command based on a product of the motor velocity based scale factor, motor velocity signal, the vehicle speed dependent damping gain (e.g. damping gain calculated from the vehicle speed signal).

As described in FIG. 3, the calculated command and the activation signal are multiplied by the damping calculation module 67 to generate the damping command.

Figure 6:
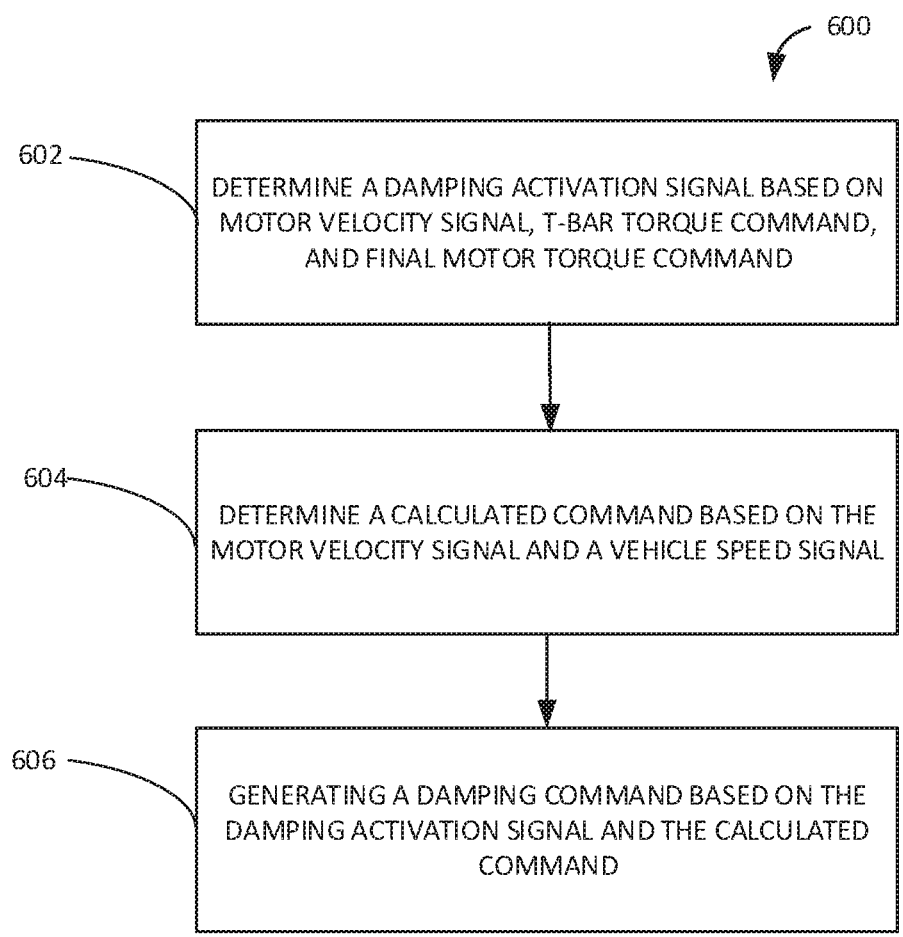
FIG. 6 is a method of actively damping a power steering system in accordance with one embodiment of the present disclosure.

FIG. 6 illustrates a method 600 of actively damping a power steering system. At block 602, a damping activation signal is determined based on a motor velocity signal, a t-bar torque signal, and a final motor command. At block 604, a calculated command is determined based on the motor velocity signal and a vehicle speed signal. At block 606, a damping command is determined based on the damping activation command and the calculated command. The damping command may reduce a motor velocity of a motor of the power steering system.

In various embodiments, the modules described above may include one or more sub-modules and datastores. As used herein the terms module and sub-module refer to an application specific integrated circuit (ASIC), an electronic circuit, a processor (shared, dedicated, or group) and memory that executes one or more software or firmware programs, or a combinational logic circuit. As can be appreciated, the sub-modules can be combined and/or further partitioned.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A system for actively damping a power steering system, the system comprising:
   a damping activation module that generates a damping activation signal based on a motor velocity signal, a t-bar torque signal, and a final motor command, the damping activation signal activates a damping command;
   a command calculation module that generates a calculated command based on the motor velocity signal and a vehicle speed signal; and
   a damping calculation module that generates the damping command in response to the damping activation signal being in a TRUE state and based on the calculated command, the damping command reducing the motor velocity of a motor of the power steering system.

2. The system of claim 1, the damping command is added to an assist command to generate a final motor command for the motor.

3. The system of claim 1, the damping activation module includes a motor-quadrant based velocity analysis module configured to determine a velocity enable signal.

4. The system of claim 3, the velocity enable signal is determined based on a magnitude of the motor velocity signal and comparing signs of the motor velocity signal and the final motor command.

5. The system of claim 1, the damping activation module further comprises a t-bar torque based velocity analysis module configured to determine a t-bar torque based analysis enable signal, wherein the t-bar torque based analysis enable signal is based at least in part on a motor velocity signal magnitude, a t-bar torque signal magnitude, and comparing signs of the motor velocity signal and the t-bar torque signal.

6. The system of claim 5, wherein an unfiltered activation logic signal is generated based on a logical combination of the velocity enable signal and the t-bar torque based analysis enable signal, wherein a low pass filter is applied to the unfiltered activation logic signal to provide a filtered activation logic signal, the damping activation signal is based on a magnitude of the filtered activation signal.

7. The system of claim 6, the calculated command is determined based at least in part on a damping gain calculated from the vehicle speed signal, a scalar value based on the motor velocity signal and the motor velocity signal.

8. A method for actively damping a power steering system, the method comprising:
determining a damping activation signal based on a motor velocity signal, a t-bar torque signal, and a final motor command, the damping activation signal being a BOOLEAN signal that activates a damping command to mitigate a rack disturbance;
determining a calculated command based on the motor velocity signal and a vehicle speed signal; and
generating the damping command by multiplying the damping activation signal and the calculated command, the damping command reducing a motor velocity of a motor of the power steering system in response to the damping activation signal being TRUE.

9. The method of claim 8, the damping command is added to an assist command to generate a final motor command for the motor.

10. The method of claim 8, further comprising determining a velocity enable signal.

11. The method of claim 10, the velocity enable signal is determined based on a magnitude of the motor velocity signal and a sign of the motor velocity signal and a final motor command.

12. The method of claim 11, further comprising determining a t-bar torque based analysis enable signal, the t-bar torque based analysis enable command is determined based at least in part on a motor velocity signal magnitude, a t-bar torque signal magnitude, and a logical sign determined from the motor velocity signal and the t-bar torque signal.

13. The method of claim 12, wherein an unfiltered activation logic signal is generated based on a logical combination of the velocity enable signal and the t-bar torque based analysis enable signal, wherein a low pass filter is applied to the unfiltered activation logic signal to provide a filtered activation logic signal, the damping activation signal is based on a magnitude of the filtered activation signal.

14. The method of claim 13, the calculated command is determined based on the vehicle speed.

15. A system for actively damping a power steering system, the system comprising:
a processor configured to:
determine a damping activation signal based on a motor velocity signal, a t-bar torque signal, and a final motor command, the damping activation signal being a BOOLEAN signal indicative of whether to reduce the motor velocity of a motor of the power steering system to mitigate a rack disturbance;
determine a calculated command based on the motor velocity signal and a vehicle speed signal; and
generate a damping command by multiplying the damping activation signal and the calculated command, the damping command reducing the motor velocity of the motor of the power steering system.

16. The system of claim 15, wherein the damping command is added to an assist command to generate a final motor command for the motor.

17. The system of claim 15, wherein for determining the damping activation signal the processor determines a first velocity enable signal based on a motor-quadrant based velocity analysis of the motor velocity signal.

18. The system of claim 17, wherein the first velocity enable signal is determined by comparing a magnitude of the motor velocity signal with a motor velocity threshold and comparing a sign of the motor velocity signal and the final motor command.

19. The system of claim 18, wherein for determining the damping activation signal the processor generates a t-bar analysis enable command by comparing the t-bar torque signal and a predetermined threshold.

20. The system of claim 19, wherein the processor generates the t-bar analysis enable command further based on numerical signs of the t-bar torque signal and the motor velocity signal being different.

\* \* \* \* \*